United States Patent Office 3,349,248
Patented Oct. 24, 1967

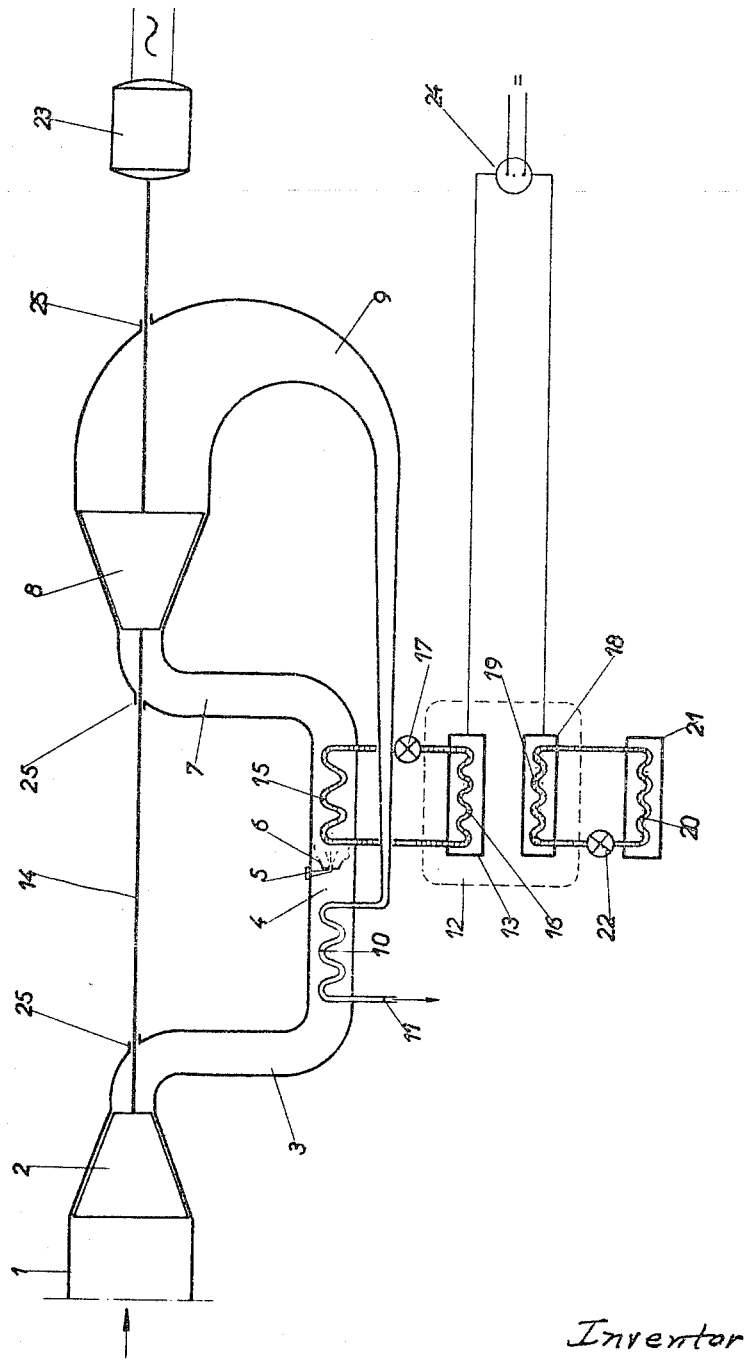

3,349,248
ELECTRIC CURRENT GENERATOR IN COMBINATION WITH AN INTERNAL COMBUSTION ENGINE
Michel Robert Garnier, Sceaux, France, assignor to Societe Nationale d'Etude et de Construction de Moteurs d'Aviation, Paris, France, a company of France
Filed June 1, 1964, Ser. No. 371,315
Claims priority, application France, June 7, 1963, 937,462
7 Claims. (Cl. 290—2)

It is known that the principle of thermoelectronic or thermionic emission is based on the rise in temperature of the cathode of an electronic tube to a level sufficient for electrons which it contains to be able to acquire enough energy in kinetic form to overcome the extraction potential of the cathode, so as to escape therefrom and move in the electric field arising from the positive voltage of the anode plate and, possibly, from the space charge of the electrons themselves.

Heretofore, the heat liberated by the Joulean effect of an electric current flowing through the cathode itself (direct heating) or through a special auxiliary filament surrounded by a tubular metal cathode carrying the emissive substance (indirect heating) has been used to provide this rise in temperature.

According to the present invention, the rise in temperature of the emitting cathode is achieved by the supply of calories deriving from a combustion process. The latter can be maintained in a chamber outside the thermionic generator, the transfer of calories being effected through the medium of a heat exchanger.

According to a further desirable feature thereof, the present invention also provides, in addition to the heating of the cathode of the generator by means of the heat liberated by a combustion process, cooling of the anode of the generator, likewise through the medium of a heat exchanger, so as to offset the heating of the anode which occurs as a result of the impact of electrons impelled by kinetic energy, such heating of the anode being obviously harmful to the thermionic emission.

In a particularly advantageous constructional form of the present invention, the thermionic generator is combined with a gas turbine engine, the heat required for heating the cathode of the generator being drawn off from the circuit of the gas turbine, the withdrawal of heat being preferably carried out in the combustion chamber of the engine, it being possible for the withdrawal of heat to commence immediately downstream of the place where combustion takes place.

This gas turbine engine can be used to drive an alternator, in which case the installation of the invention makes it possible to have available both direct current, which is available between the cathode and the anode of the thermionic generator, and alternating current delivered by the alternator, these two sources of current drawing their energy from a common origin, namely the combustion chamber of the engine.

The description which follows with reference to the accompanying drawing, and given by way of non-limitative example only, will make it possible to understand how the invention can be carried into effect, the details appearing both from the text and from the drawing forming part of the said invention.

The single figure of the drawing is a diagram of a generating installation for direct current and alternating current constructed in accordance with the present invention.

Referring to the drawing, the installation comprises a gas turbine engine, of which there is shown the compressor 2 with its air intake orifice 1 and its delivery duct 3 leading to the combustion chamber 4 equipped with injectors 5 and burners 6 and connected to the inlet duct 7 of the turbine 8, the exhaust of which is delivered to a conduit 9 communicating with a heat exchanger tube 10 which is located upstream of the combustion chamber 4 and which terminates in the exhaust pipe 11. The turbine 8 is coupled to the compressor 2 by a shaft 14 having labyrinth packings which can be seen at 25.

The gas turbine engine is associated with a thermionic generator 12, the cathode 13 of which consists of a metal advantageously chosen to have a low critical temperature and traversed by a coil 16 which is located in a fluid circuit including another coil 15 disposed in the combustion chamber 4; a suitable supply of fluid in this circuit is ensured by a pump 17.

The anode 18 of the thermionic generator 12 is in the form of a plate traversed by a coil 19 of a second fluid circuit which likewise includes another coil 20 outside the generator 12, housed in a cooling chamber 21. A pump 22 may be inserted in this second circuit if forced circulation is necessary.

A direct current supply point 24 is connected to the terminals of the electrodes 13 and 18 of the generator 12, while alternating current is obtained from the terminals of an alternator 23 keyed on the shaft 14 of the turbine 8.

The installation which has just been described operates in the following manner (the temperatures in brackets are given merely to indicate orders of magnitude and to provide a clear indication of how the invention can be carried into effect):

The outside air (15° C.) picked up at the intake 1 is drawn in by the compressor 2, which increases its pressure and temperature (180° C.). This air flows through the duct 3, is heated (390° C.) on contact with the heat exchanger tube 10, which delivers up to the air, the residual heat energy of the exhaust gases travelling towards the pipe 11. The combustion of the fuel distributed by the injectors 5 and burning after ignition behind the burners 6 brings the gases to a high temperature (1600° C.), but the latter immediately give up a large proportion of their available heat to the coil 15, in which there circulates the heat transmitting fluid. The gases partially cooled in this way (1000° C.) arrive by way of the inlet duct 7 at the turbine 8, where they expand, their pressure energy being converted into rotative mechanical energy and being transmitted by the shaft 14 of the turbine to the alternator 23 and to the compressor 2. The gases finally escape at 11 after giving up a part of the residual heat energy, as already explained.

The circulation of the fluid in the circuit 15–16 raises the temperature of the cathode 13 to the point of electronic emission, a plate voltage being supplied if necessary at 24.

It will therefore be noted that the installation described enables alternating current to be available at the terminals of the alternator 23, which is driven by the turbine 8, and direct current at the supply point 24, which is connected to the terminals of the thermionic generator 12. The characteristics of these currents (voltage, intensity, frequency) depend on the choice of alternator and thermionic generator.

The anode becomes heated, but its temperature can be reduced by means of the fluid which circulates in the circuit 19–20 and which is cooled at 21, for example by a flow of cold water.

It will be noted that in the gas turbine circuit it is not necessary to cool the combustion gases produced in the chamber 4 by dilution with fresh secondary air, as is customary in gas turbine practice since, on the one hand, the high-temperature gases (1600° C.) only encounter rigid strong elements, in the present case the coil 15, through which, moreover, there flows a cooling fluid and, on the other hand, the withdrawal of heat which is effected at this level has the result that the gases delievered to the turbine 8 are at a lower temperature (1000° C.), which the movable blades thereof can perfectly well accept. Therefore, there is the benefit of a source of high-temperature heat promoting the emission of electrons and the transmission of heat is effected with a slight increase in entropy.

It will also be noted that the residual heat energy of the gases after expansion in the turbine 8 is used at 10 to preheat the air upstream of the combustion chamber 4.

It is obvious that modifications may be made in the constructional form which has just been described, in particular by substituting equivalent technical means, without thereby departing from the scope of the invention as defined by the claims.

In particular, it is clear that the invention does not apply exclusively to a diode form of thermionic generator, but to electronic tubes having any number of electrodes. The envelope may be under high vacuum or it may contain gas at low pressure.

Likewise, the invention does not depend either on the manner in which the transfer of the heat from the combustion gases to the cathode 13 or from the anode 18 to the cooling body 21 is effected (this may be by conduction, convection or radiation), or on the type of heat exchanger employed, or, finally, on the kind of circulation (closed or open).

What is claimed is:

1. An installation for generating electric current comprising in combination, a gas turbine engine including a compressor, a combustion chamber provided with burners, an air supply passage connecting said compressor and said combustion chamber, and a turbine connected to said combustion chamber and having an exhaust conduit; a thermionic generator having a cathode and an anode; a first heat exchanger cooperating with said engine and said generator for withdrawing heat from said combustion chamber and applying said heat to said cathode to heat same and generate direct current; a second heat exchanger for transferring heat from the exhaust gases in said exhaust conduit to the air in said air supply passage; and an alternator operatively coupled to said engine and adapted to generate an alternating current.

2. An installation according to claim 1, wherein said cathode is disposed externally of said engine.

3. An installation according to claim 2, wherein said first heat exchanger includes a first heat exchange element associated with said engine to receive heat from hot gases generated in said combustion chamber, and a second heat exchange element associated with said first element and said cathode to deliver the heat from said first element to said cathode.

4. An installation according to claim 3, wherein said first heat exchange element and said second heat exchange element are in the form of a first coiled tube and a second coiled tube, respectively.

5. An installation according to claim 4, wherein said first coiled tube is disposed in said combustion chamber immediately downstream of the beginning of the combustion zone thereof.

6. An installation according to claim 4, wherein said second coiled tube traverses said cathode and registers with said first coiled tube.

7. An installation according to claim 1, wherein said second heat exchanger includes a tubular heat exchange element extending in said air supply passage and connected to said exhaust conduit for the passage of exhaust gases through said element to heat the air in said air supply passage.

References Cited
UNITED STATES PATENTS

| | | | |
|---|---|---|---|
| 2,663,145 | 12/1953 | Waeselynck | 60—39.18 |
| 3,234,412 | 2/1966 | Sankowich | 310—4 |
| 3,238,395 | 3/1966 | Sense | 310—4 |

MILTON O. HIRSHFIELD, *Primary Examiner.*

J. W. GIBBS, *Assistant Examiner.*